Dec. 25, 1934. W. J. GORMAN 1,985,446
CHUCK
Filed Jan. 7, 1931

INVENTOR
William J. Gorman
BY
Mitchell Buhet
ATTORNEYS.

Patented Dec. 25, 1934

1,985,446

UNITED STATES PATENT OFFICE 1,985,446

CHUCK

William J. Gorman, New Britain, Conn., assignor to The Fafnir Bearing Company, New Britain, Conn., a corporation of Connecticut Application January 7, 1931, Serial No. 507,182

4 Claims. (Cl. 279—1)

My invention relates to a gripping device such as a chuck, and more particularly to chuck actuating mechanism for a chuck preferably of the type disclosed in Scaife Patent No. 1,389,272, dated August 30, 1921.

It is an object of the invention to provide a device of the character indicated having an actuating mechanism of simple construction and easy to operate.

It is a further object to provide an actuating mechanism for a spring type of chuck which is easy to operate, and which may serve to automatically maintain the chuck in open position.

Other objects and features of the invention will be pointed out or will become apparent upon a reading of the specification.

In the drawing which shows, for illustrative purposes only, preferred forms of the invention—

Figure 1:
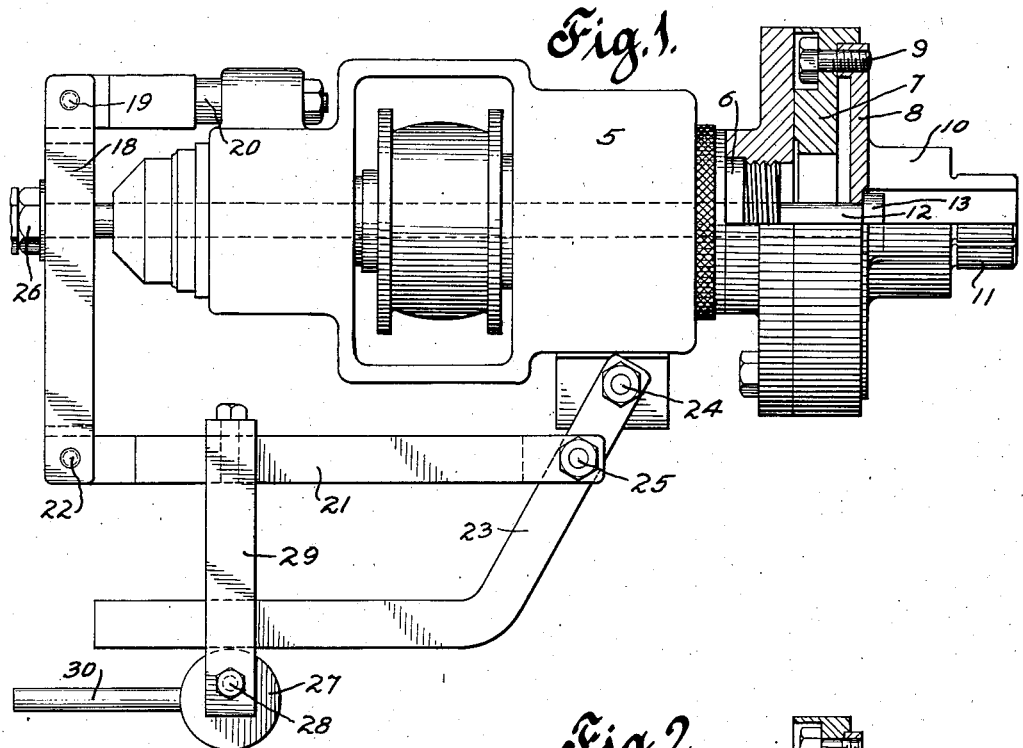
Fig. 1 is a plan view of a chuck and actuating mechanism illustrating features of the invention.

The invention will be described in connection with a rotatable chuck.

In said drawing, 5 indicates a suitable base or standard for receiving a chuck spindle 6 carrying a chuck. In the preferred form illustrated, the chuck includes a body 7. To the body, a diaphragm 8 is secured by means of screws 9. Chuck jaws 10 are carried by the diaphragm 8 whereby upon flexure of the diaphragm the chuck jaws will be moved.

In the form shown in Fig. 1, the jaws 10 are formed as integral parts of the diaphragm 8 and are arranged as shown at 11 for internal gripping. The diaphragm 8 is flexed by means of an actuating rod 12 which may be secured to the diaphragm or provided merely with a head 13 for engagement with the right-hand side of the diaphragm so that upon movement of the rod 12 toward the left the diaphragm will be flexed toward the left and cause the gripping surfaces 11—11 to contract to permit a work piece to be placed on the jaws. Upon release of the actuator 12, the diaphragm 8 will spring back so as to cause the jaws 10—10 to expand and thus tightly grip the work piece.

Figure 2:
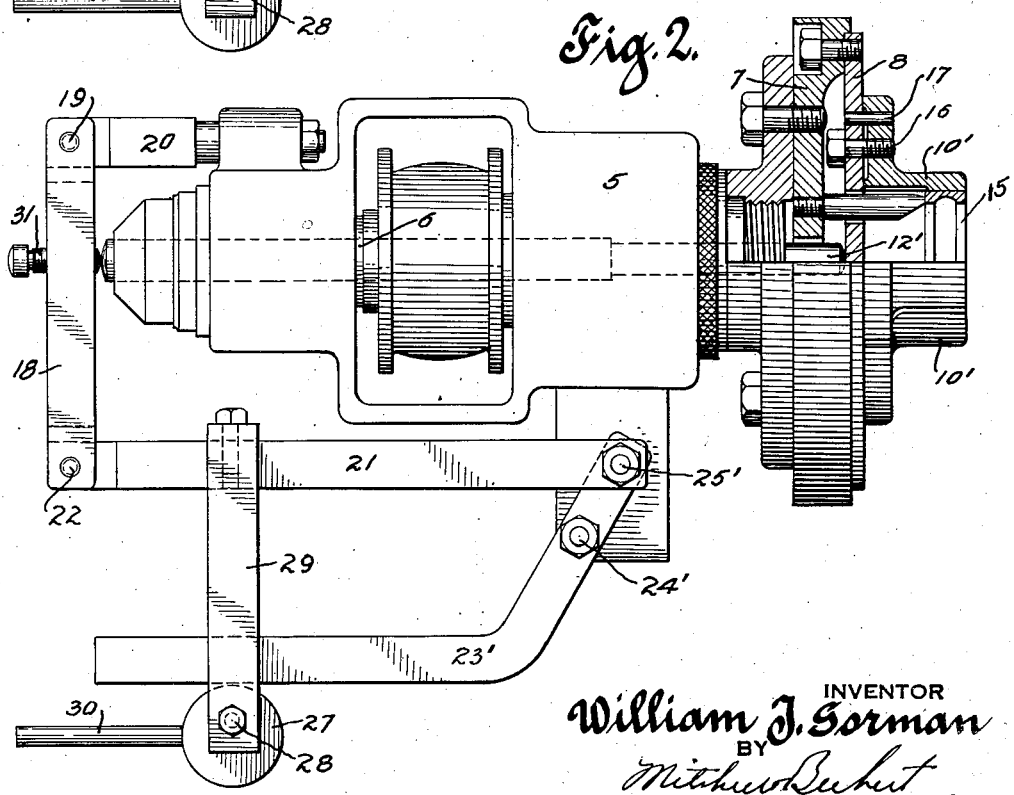
Fig. 2 is a view similar to Fig. 1, but illustrating a slightly different arrangement of actuating mechanism.

In the form shown in Fig. 2, the jaws 10' are arranged for external gripping of a work piece such as a bearing ring 15, and the jaws 10' in this instance are shown as separate members secured to the diaphragm as by means of screws 16 and dowels 17. The actuator 12' is in this case a push rod, whereby upon movement of the push rod toward the right, the diaphragm is flexed outwardly so as to cause the jaws 10'—10' to expand so as to release the work piece 15.

My invention relates particularly to a means for moving the actuators 12—12'. In the particular form shown, each actuator extends rearwardly through the spindle and is operated from the rear of the spindle. As illustrated, a lever 18 is pivotally mounted at 19 to a part of the support 5 such as a rod 20 secured thereto. To the opposite end of the lever 18, a link 21 is pivoted at 22. In order to draw on the link 21, I provide what may be termed a toggle lever 23, which may be pivoted to the support 5 as indicated at 24. The link 21 is pivoted at 25 to an intermediate part of the toggle lever 23. Thus, by moving the toggle lever 23 upwardly as viewed in Fig. 1, the link 21 will rotate the lever 18 in a clockwise direction about its pivot 19, and since the actuating rod 12 for the chuck is secured to the lever 18 as by means of a nut 26, the diaphragm 8 will be flexed inwardly so as to move the jaws 10—10 to the ungripping position.

In order to facilitate operation of the toggle 23, I provide a device such as an eccentric 27 or other cam. In the form shown, the cam 27 is pivoted at 28 to an arm 29, in this case carried by the link 21. A manually operable bar or handle 30 is secured to the cam 27 so that upon rotation of the cam by the handle, the toggle 23 is moved inwardly by the handle so as to cause the actuator 12 to draw on the diaphragm 8 and release the work piece. It will be clear that with an eccentric or other properly formed cam the latter may be turned until it reaches dead-center, at which point the handle 30 may be released, and the chuck will remain in the open position until the lever 30 is again turned to cause the eccentric to release the toggle 23, at which time the diaphragm 8 will spring back so as to move the jaws 10—10 to the gripping position.

In the form shown in Fig. 2, the parts are substantially the same, except that in Fig. 2, the lever 21 is pivoted at 25' to the extreme end of the toggle 23', and the latter is pivoted at a point intermediate its ends to the support as indicated at 24'. In Fig. 2, the lever 18 engages the end of the actuator 12' as by means of an adjustable set screw 31. Thus, with the arrangement of Fig. 2, when the handle 30 is rotated in a counter-clockwise direction from the position shown, the lever 23' will be moved about the pivot 24', and such movement through the link 21 and lever 18 will force the actuator 12' toward the right so as to flex the diaphragm outwardly and cause the jaws 10' to release the work piece.

It will thus be seen that I have provided a chuck actuating mechanism which is of relatively simple construction, and which will be very easy to operate. It will also be clear that the cam or eccentric such as 27 may be moved to dead-center, and when so moved, the handle 30 may be released and the chuck will remain in the position determined by the position of the cam or eccentric. In other words, an operator need not constantly hold any lever or part in order to have the chuck remain open. This is at times a distinct advantage. It will also be seen that by a simple shifting of the pivot points 24—25, the same actuating mechanism may be employed for a chuck arranged for either external or internal gripping.

In both forms shown in the drawing the range or degree of throw of the actuator by the lever mechanism may be varied by adjusting the arm 29 to or fro on the link 21. This moves the cam 27 nearer to or further from the fulcrum of the lever with which it cooperates and hence varies the degree to which said lever and associated parts are moved by said cam.

While the invention has been described in considerable detail and modifications illustrated, it is to be observed that various changes, omissions, and additions may be made within the scope of the invention as defined in the appended claims.

I claim:

1. In a device of the character indicated, a fixed support, a spindle rotatably carried thereby, a chuck carried by said spindle and having a chuck actuator bar extending rearwardly in said spindle, a lever pivotally carried by said fixed support and extending transversely across the end of said spindle to engage said chuck actuator bar for moving the same, a toggle lever pivotally mounted on said fixed support, a link connecting said toggle lever and said transversely extending lever, and cam means for moving said toggle lever whereby said lever system will be actuated to move said chuck actuator bar, said cam means being shiftable, and means to hold said cam means in various shifted positions nearer to or further from the fulcrum of said toggle.

2. In a device of the character described, a support, a hollow spindle rotatably mounted thereon, a chuck carried by said spindle, a bar extending through said spindle and operatively connected with said chuck at one end to flex the same, means for moving said bar comprising a lever and a manually operable cam so supported as to operate said lever, with means for supporting said cam, said supporting means being shiftable to different positions to vary the effect of said cam on said lever.

3. A chuck, a chuck jaw actuator operatively connected therewith, a lever system mounted to coact with said actuator to move the same and so constructed that the actuator may be moved in either of opposed directions, and cam means so mounted as to operate said lever mechanism.

4. In a device of the character indicated, a chuck, a chuck actuator member, and means to move said actuator member comprising a plurality of levers, and a manually operable cam carried by one of said levers and cooperable with another of said levers for moving one of the latter to operate said actuator member.

WILLIAM J. GORMAN.